Figure 3:
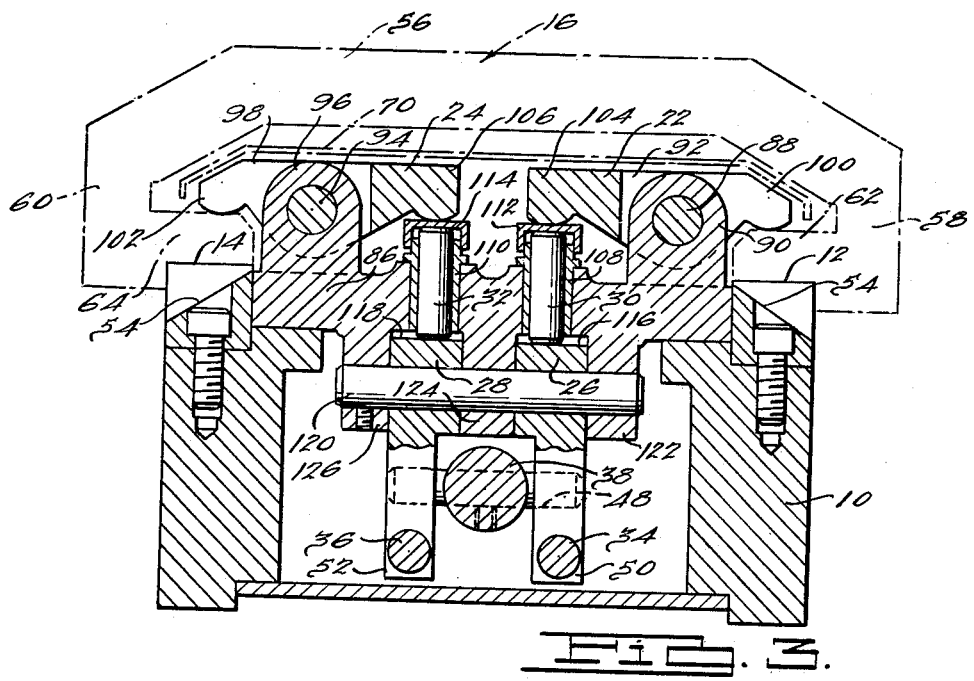

March 30, 1954  R. E. CROSS  2,673,386
LOCATING AND CLAMPING MECHANISM
Filed Feb. 19, 1952  3 Sheets-Sheet 1
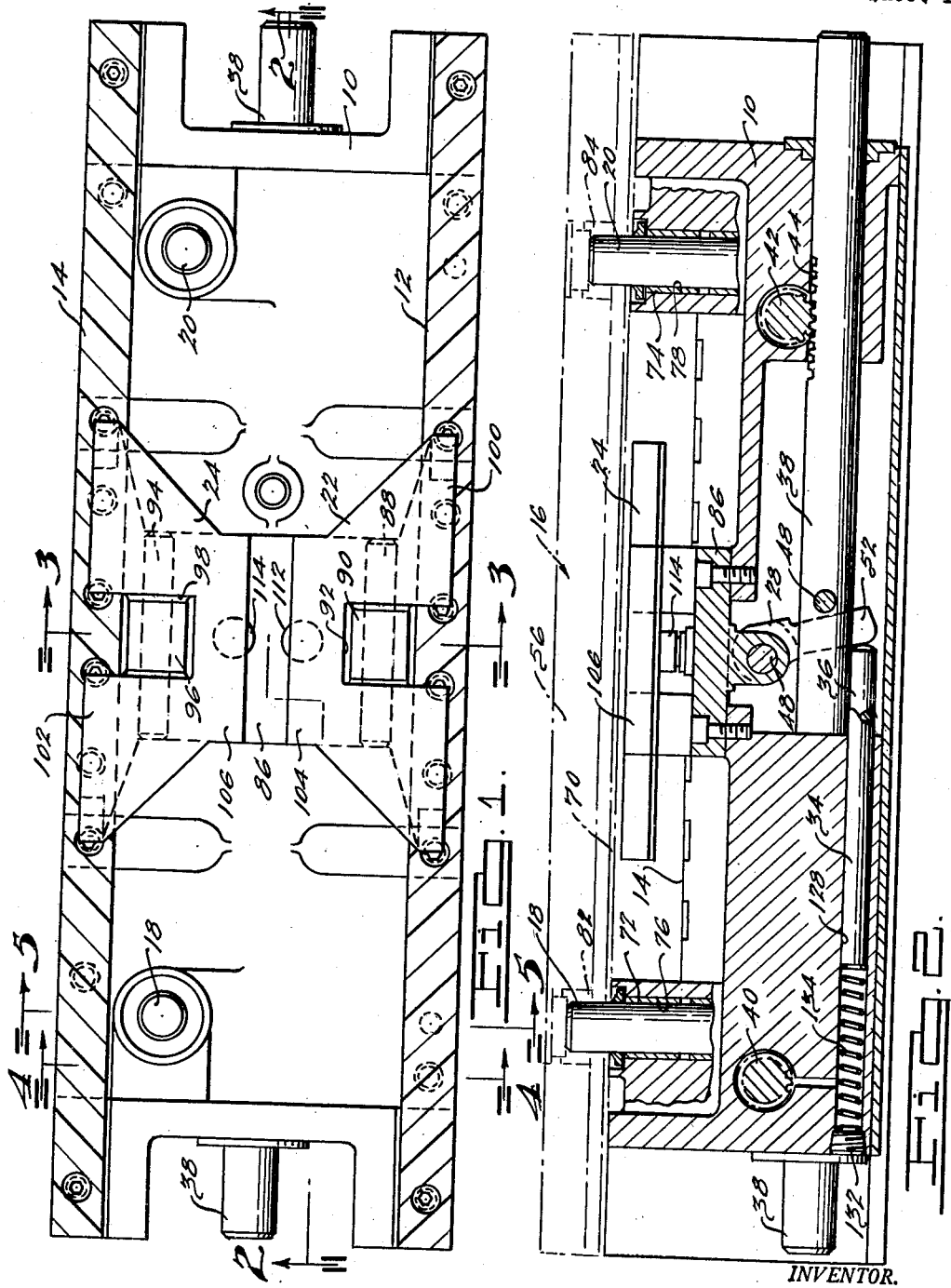
INVENTOR.
Ralph E. Cross.
BY
Barness, Dickey & Pierce
ATTORNEYS.

March 30, 1954  R. E. CROSS  2,673,386
LOCATING AND CLAMPING MECHANISM
Filed Feb. 19, 1952  3 Sheets-Sheet 3

INVENTOR.
Ralph E. Cross,
BY
Harness, Dickey & Pierce
ATTORNEYS

Patented Mar. 30, 1954

2,673,386

UNITED STATES PATENT OFFICE 2,673,386

LOCATING AND CLAMPING MECHANISM

Ralph E. Cross, Grosse Pointe Shores, Mich.

Application February 19, 1952, Serial No. 272,280

11 Claims. (Cl. 29—1)

The invention relates to fixture locating and clamping mechanism for machine tools.

In the operation of certain types of automatic machine tools it is conventional practice to move workpieces into the machine while mounted on a pallet which slides on ways extending through the machine. Once in the machine, the pallet is located to position the work accurately with respect to the tool which is to act on the work and it is then securely clamped in the locating position. A locating and clamping mechanism of the type referred to above is disclosed in my copending application Serial No. 142,517, filed February 4, 1950.

It also is conventional practice to arrange a number of machine tools in series relation where a plurality of operations are to be performed on the work. In installations of this type, the pallets are moved successively from one machine to another, and a separate locating and clamping mechanism is provided at each machine. Separate locating and clamping mechanisms for the machines are necessary, as the number and arrangement of the machines vary considerably, depending upon the exigencies of the particular situation, and it is occasionally necessary to remove or rearrange machines in the line. It is the usual practice to transfer all of the pallets at the same time; and after the pallets have been transferred, they are all located and clamped simultaneously preparatory to machining operations on the work. Thus, it is desirable that the individual locating and clamping mechanisms be connected for mutual simultaneous operation.

The usual practice has been to operate the individual locating and clamping mechanisms by suitable hydraulic or pneumatic cylinders which are actuated by electrically operated valves. This system of operation requires that the hydraulic and electrical circuits of the locating and clamping mechanisms be interconnected with each other and interlocked with the working cycles of the machine tools. The result is a large number of mechanical and electrical operating parts and the intricate connections between the parts are a constant source of trouble. Electrical connections are disrupted or become faulty in operation and hydraulic apparatus develops leaks which require frequent service. When trouble develops in these parts it is necessary to shut down the entire line of machines, and valuable production time is lost.

In my copending application referred to above I disclose a locating and clamping mechanism wherein the locating and clamping parts are actuated by a rotatable rod and the arrangement is such that the actuating rods of adjacent units can be mechanically interconnected for mutual operation. This construction has proved to be satisfactory in every respect where the line of machines is not too long. However, in a long line of machines, sufficient torsional deflection or wind-up occurs in the mechanically interconnected actuating rods of the several locating and clamping mechanisms so that some trouble is encountered in obtaining proper simultaneous operation of the entire mechanisms. Under these circumstances it has been necessary to provide a plurality of drive means for the mechanically connected actuator rods at spaced points along the line of machines.

The instant invention is an improvement in the apparatus disclosed in my prior application supra. The locating and clamping mechanism of this invention is generally similar to the one disclosed in my prior application, but the operating parts of the mechanism have been reconstructed so that the locating and clamping devices are operated by means of a longitudinally slidable shaft, and the terminal portions of the shaft are exposed for engagement with corresponding shafts of adjacent similar mechanisms. Thus, in the improved construction, motion is transmitted directly in push-pull fashion from one clamping mechanism to another, and there is no possibility of lost motion in the mechanisms or between the separate locating and clamping units. The entire line of machines can be operated simultaneously by a single actuator, and there is no loss in efficiency even though the line of machines is exceedingly long. The number of parts required to operate the locating and clamping mechanisms is maintained at a minimum, and, as a consequence, down time of the machines due to operational failures in the locating and clamping mechanisms also is maintained at a minimum.

Figure 4:
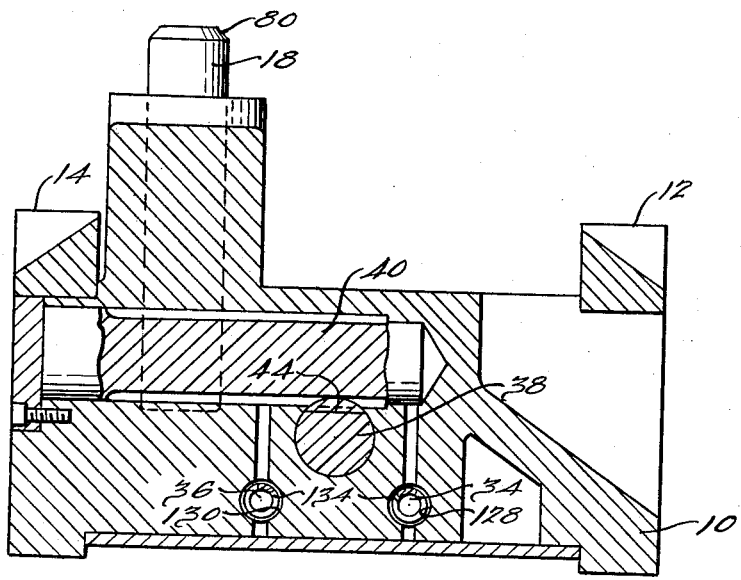
Figure 5:
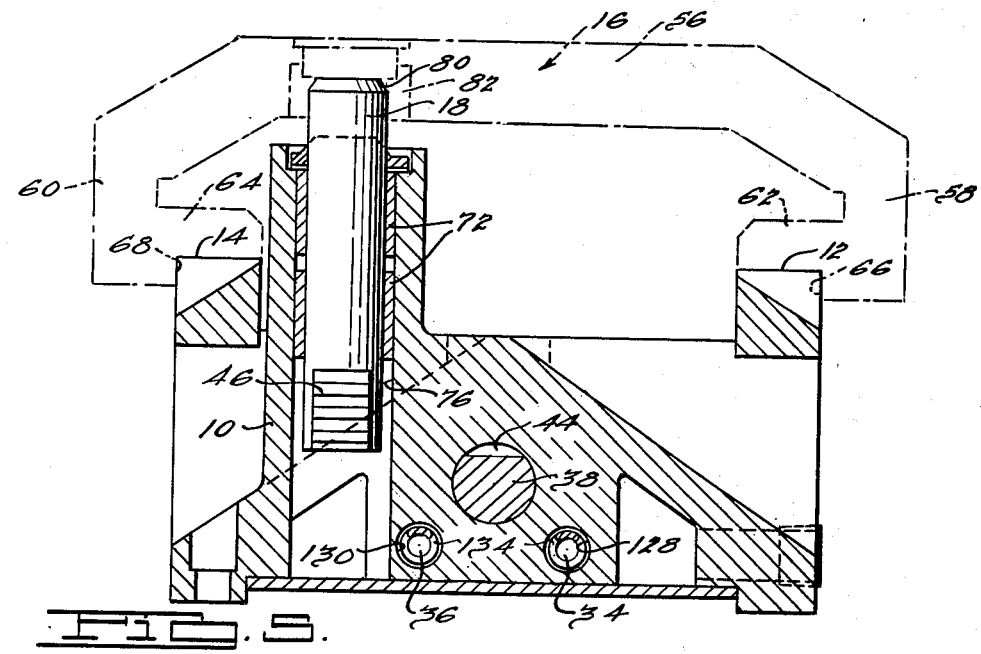
Figure 6:
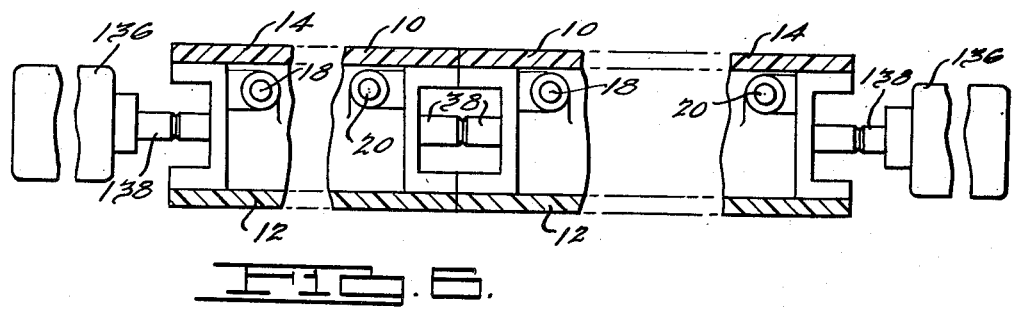
Figure 7:
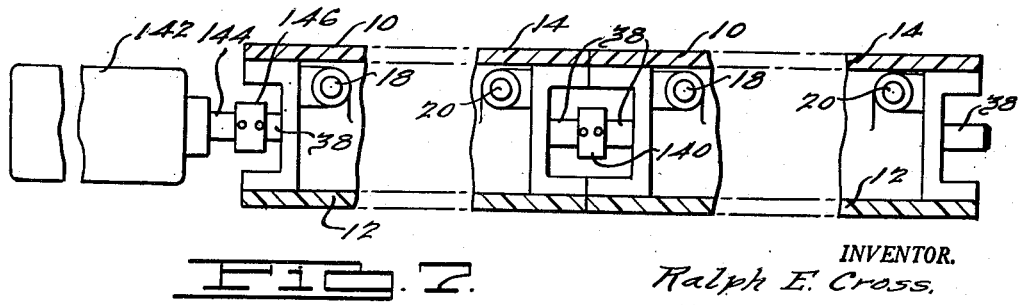

In the drawings forming a part of this specification and wherein like numerals are employed to designate like parts throughout the same, Fig. 1 is a top plan view of a locating and clamping unit embodying the invention, Fig. 2 is a longitudinal sectional view taken on the line 2—2 of Fig. 1, Fig. 3 is a transverse sectional view taken on the line 3—3 of Fig. 1, Fig. 4 is a transverse sectional view taken on the line 4—4 of Fig. 1, Fig. 5 is a transverse sectional view taken on the line 5—5 of Fig. 1, Fig. 6 is a diagrammatic view showing how a plurality of the locating and clamping units of this invention are placed end to end for mutual operation by a pair of hydraulic cylinders disposed at opposite ends theerof, and Fig. 7 is a view similar to Fig. 6 but showing the units interconnected for operation by a single hydraulic cylinder.

It is believed that the invention will be best understood by first considering the basic features and the general operation of the locating and clamping unit. In the form of the invention shown, this unit has an elongated base 10 provided with laterally spaced, parallel, longitudinal rails or ways 12 and 14 which support or guide a pallet 16 shown by broken lines in the drawings. In practice the base 10 is mounted in front of a machine tool or the like (not shown), and the pallet 16 carries work (not shown) which is to be acted upon by the tool of the machine. As suggested, apparatus of this type is intended primarily for use in a multiple-station machine set-up, and in a situation of this type a plurality of the bases 10 are arranged end to end, one in front of each machine.

The ways 12 and 14 abut or are otherwise suitably interconnected so that the pallets 16 can be moved progressively from base to base either manually or automatically by suitable mechanical means.

Vertically slidable locating bolts 18 and 20 are carried by the base 10, and these bolts are projectible upwardly from the base to engage suitable locating holes in the pallet 16 so as to position the latter accurately on the base. While two locating bolts are here shown, it will be readily understood that any suitable number may be employed. As a general proposition, it will be necessary to use at least two locating bolts in order to locate the pallet accurately. In the form of the invention shown, both of the locating bolts 18 and 20 are disposed at one side of the longitudinal center of the base 10. However, this particular relationship is not critical, and the bolts may be located as required and according to the exigencies of the particular situation. Bolts 18 and 20 normally are retracted to permit free, unobstructed passage of the pallet 16 across the base 10.

After the pallet 16 has been properly located it is necessary to clamp it solidly on the base 10 for the machining operation in order to relieve the locating bolts 18 and 20 of excessive strain and to hold the pallet 16 and the work carried thereby absolutely stationary. To this end the base 10 is equipped with a pair of laterally spaced clamps 22 and 24 which are engageable with the runners of pallet 16 to press the same solidly downwardly against the ways 12 and 14. The clamps 22 and 24 are moved between engaged and released positions by cams 26 and 28 which act through slidable pins 30 and 32 respectively, and the cams are normally positioned to hold the clamps in clamping or engaging position by spring-loaded plungers 34 and 36. Manifestly, the clamping force exerted against the pallet 16 by clamps 22 and 24 depends upon the form of the cam surfaces 28 and 26 and upon the spring pressure exerted against plungers 34 and 36.

Both the locating bolts 18 and 20 and the two clamping mechanisms are actuated by a single shaft 38 mounted in the base 10 for longitudinal sliding movement relative thereto and disposed substantially on the longitudinal center line of the base laterally of the locating bolts 18 and 20 and midway between the cams 26 and 28. Elongated pinions 40 and 42, one for each of the locating bolts 18 and 20, extend transversely between respective locating bolts and the actuator shaft 38, and these pinions engage racks 44 on the actuator shaft and racks 46 on the locating bolts so that axial reciprocation of the shaft 38 raises and lowers the bolts. Motion is transmitted from the shaft 38 to the clamp operating cams 28 and 26 by a cross pin 48 positioned to engage operating elements 50 and 52 formed on and depending from the cams.

At the beginning of an operating cycle the actuator shaft 38 is positioned all the way to the left as viewed in Fig. 2, in which position the locating bolts 18 and 20 are lowered and the cross pin 48 holds the clamp operating cams 50 and 52 to the left as viewed in Fig. 2 against the action of the spring-loaded plungers 34 and 36 so that the clamps 22 and 24 are released or in unclamping position. With the parts thus positioned, the pallet 16 can be moved onto and across the base 10 without interference. After the pallet 16 has been moved into approximate position on the base 10, the shaft 38 is moved to the right as viewed in the drawing. Initial movement of the shaft in this direction raises the locating bolts 18 and 20 into engagement with the pallet, and if the latter is a little off position, either longitudinally or transversely, the bolts shift it to an exact position on the base. During this initial movement of the shaft 38, cross pin 48 continues to hold the clamps 22 and 24 disengaged from the pallet 16. The clamp-operating elements 50 and 52 of course pivot in a counterclockwise direction (Fig. 2) during such initial movement due to continual pressure by the spring-biased plungers 34 and 36 but the contour of cams 26 and 28 is such that the clamps are not actuated to engage the pallet 16. However, as the shaft 38 continues to move to the right, the cross pin 48 progressively releases the clamp-operating elements 50 and 52, and the spring-loaded plungers 34 and 36 continue to act against the clamp-operating elements 50 and 52 to finally engage the clamps 22 and 24 with the pallet 16. At the end of this movement, the cross pin 48 preferably entirely disengages the elements 50 and 52 so that the full force of the spring-loaded plungers 34 and 36 is utilized to clamp the pallet 16. During the final movement of shaft 38 to the right the locating bolts 18 and 20 continue to rise, but no useful purpose is served thereby and they merely continue to penetrate the locating holes of the pallet.

After the machining or other operation on the work is completed a reverse operation occurs when actuator shaft 38 is moved to the left as viewed in the drawing. The cross pin 48 engages the clamp-operating elements 50 and 52 to pivot the cams 26 and 28 in a clockwise direction (Fig. 2) and against the action of spring-loaded plungers 34 and 36. This motion continues until the clamps 22 and 34 disengage or release the pallet 16. The locating bolts 18 and 20 of course are progressively retracted or lowered during the entire movement of shaft 38 to the left, and by the time the shaft reaches the end of its travel in this direction the bolts are entirely lowered and disengaged from the pallet 16.

For convenience, a more detailed description of the several parts is now given. The particular base 10 here shown is of generally rectangular shape in plan. It preferably is a casting and is suitably constructed to support the several parts hereinabove described. Also the base 10 preferably is suitably cored out to maintain its weight and cost as low as possible, consistent with adequate strength and rigidity.

The rails 12 and 14 extend along opposite sides of the base 10 with the top surfaces thereof projecting slightly above the top surface of the base. Also, in this connection it will be observed that the rails 12 and 14 are formed throughout the entire length thereof with grooves 54 which extend diagonally across the top surfaces thereof (Fig. 1)

and slope angularly outwardly and downwardly (Fig. 3). These grooves 54 receive dirt, chips, and other particles which otherwise might accumulate between the rails and the pallet 16 and score or otherwise damage the contact surfaces of the parts. Shavings or chips which accumulate on the ways during machining or other operations are pushed into the grooves 54 by the pallet 16 as it is moved across the base 10, and particles which accumulate in the grooves slide downwardly to the outer sides of the base where they are collected and disposed of in any suitable manner.

It will be readily apparent that the pallet 16 comprises no part of the present invention, and it is here shown merely to illustrate the function and utility of the locating and clamping mechanism. The particular pallet 16 here shown by way of illustration has a top deck 56, depending side flanges 58 and 60 and runners 62 and 64 which extend inwardly from the lower edges of respective flanges. The runners 62 and 64 travel on ways 12 and 14 respectively as perhaps shown in Fig. 3 and they preferably are formed with longitudinal shoulders 66 and 68 which slidably embrace the outer sides of the ways 12 and 14 so as to guide the pallet 16 during its travel across the base 10. A guard 70 carried by the base 10 covers the ways 12 and 14 as well as the locating and clamping mechanisms on the base and assist in preventing chips and the like from falling on the ways or otherwise interfering with the operation of the mechanism.

The locating bolts 18 and 20 are supported for vertical sliding movement by bushings 72 and 74 inserted in vertical bores 76 and 78 provided in the base 10. The upper ends of the locating bolts are chamfered or beveled as at 80 so that the bolts enter the holes of an approximately positioned pallet 16 and cam the same horizontally into an accurate position as the bolts become fully entered. The locating bolts 18 and 20 preferably enter hardened and ground bushings 82 and 84 to position or locate the pallet fixture 16.

The clamping mechanisms are grouped together as a subassembly preferably located at substantially the middle of the base 10. Specifically, the several parts of the clamping assembly are carried by a mounting bracket 86 which spans the top of the base 10 and is bolted or otherwise fastened thereto. The clamp 22 is rockably mounted on a horizontal pivot 88 carried by an upstanding support 90 on the mounting bracket 86. As shown in Figs. 1 and 3, the support 90 fits loosely into a slot 92 in the clamp 22 and the terminal portions of the pivot 88 are journaled in the clamp at opposite sides of the slot 92. The clamp 24 is similarly rockably mounted on a horizontal pivot 94 which in turn is carried by a support 96 on and extending upwardly from the mounting bracket 86. Also, it will be observed that the support 96 extends into a slot 98 provided in the clamp 24 and that the terminal portions of pivot 94 are journaled in the clamp at opposite sides of the slot 98. As shown in Fig. 1 the two clamps 22 and 24 are aligned transversely on the base 10. Clamping jaws 100 and 102 extend outwardly from the pivots 88 and 94 to engage the runners 62 and 64, and operating arms 104 and 106 extend inwardly from the pivots and above pins 30 and 32 respectively.

The pins 30 and 32 are mounted for vertical sliding movement in bushings 108 and 110 and are located directly under the inner ends of respective arms 104 and 106. Caps 112 and 114 surmounting pins 30 and 32 fit slidably over the upper ends of bushings 108 and 110 to prevent dirt and the like from having access between the pins and the bushings. As shown in Fig. 3, the inner ends of arms 104 and 106 seat directly on the caps 112 and 114 at all times, and the lower ends of the pins 30 and 32 ride on eccentric cam surfaces 116 and 118 of cams 26 and 28 respectively.

The two cams 26 and 28, in turn, are mounted for pivotal movement about a horizontal pivot 120 extending transversely of base 10 and carried by lugs 122, 124, and 126 on and depending from the mounting bracket 86. The cam surfaces 116 and 118 are disposed eccentrically to the pivot 120, so that the distance between the cam surfaces and the pivotal axis becomes progressively less as the cams swing in a clockwise direction as viewed in Fig. 2. Thus, as the cams 26 and 28 swing in a clockwise direction, they progressively reduce the pressure against pins 30 and 32 and gradually release clamps 22 and 24. Conversely, the distance between cam surfaces 116 and 118 and the pivotal axis becomes progressively greater as the cams pivot in a counterclockwise direction, as viewed in Fig. 2. Accordingly, as cams 26 and 28 pivot in a counterclockwise direction, they apply progressively increasing pressure against pins 30 and 32 to move clamps 22 and 24 into clamping engagement with the runners 62 and 64.

The plungers 34 and 36 slide in bores 128 and 130 provided in and extending longitudinally of the base 10 in alignment with respective cam operating elements 50 and 52 (Fig. 5). One end of each plunger projects from the bore in which it is mounted and engages a respective cam-operating element. The other ends of the bores 128 and 130 are closed by plugs 132. Springs 134 confined between the plugs 132 and plungers 34 and 36 urge the latter into pressed engagement with the clamp-operating elements 50 and 52 and normally hold the clamps 22 and 24 positioned to engage the pallet runners 62 and 64.

The shaft 38 is journaled in any suitable manner for longitudinal sliding movement relative to the base 10, and the terminal portions thereof project from the base for engagement with and, if necessary, coupling to corresponding shafts of adjacent units in multiple-station machines.

In general I prefer to make the shaft 38 of sufficient length so that the shafts of adjacent locating and clamping units abut as shown in Fig. 6. When a long line of units are mounted side by side in this manner, the operating shafts 38 of all the locating and clamping mechanisms can be actuated simultaneously and in unison by attaching a suitable actuator 136 such as a fluid motor or the like at each end of the line with the piston rods 138 of the motors engaging the adjacent shafts 38. The motors 136 can then be actuated alternately to operate the collective locating and clamping mechanisms. This arrangement has the advantage that each individual locating and clamping unit can be easily and quickly removed for replacement or repair and without necessity of uncoupling it from adjacent units and without dismantling or in any way disturbing the adjacent units.

Alternatively, the actuator shafts 38 of the several locating and clamping units can be mechanically coupled by suitable connections 140 as shown in Fig. 7 for operation by a single fluid motor 142 mounted at one end of the line and having the piston rod 144 thereof connected to the adjacent shaft 38 by a suitable coupling 146.

Having thus described the invention, I claim:

1. Locating and clamping mechanism comprising a base adapted to support a separate movable work fixture, vertically movable locating bolts carried by the base and projectible therefrom to engage and locate a fixture on the base, at least one separate clamping device on said base positioned to engage a fixture located by said bolts, an actuator rod mounted in and slidable longitudinally with respect to said base, means interconnecting said locating bolts and said actuator rod operative to project the bolts into engagement with the work fixture upon initial sliding movement of the actuator rod in one direction, and means coactive with said clamping device and said actuator rod operative to hold said clamping device released during said initial sliding movement and to engage said clamping mechanism with the fixture only after said initial sliding movement is completed.

2. Locating and clamping mechanism comprising a base adapted to support a separate movable work fixture, vertically movable locating bolts carried by the base and projectible therefrom to engage and locate a fixture on the base, at least one separate clamping device on said base positioned to engage a fixture located by said bolts, an actuator rod mounted in and slidable longitudinally with respect to said base, said rod having terminal portions exposed at the ends of the base for engagement with corresponding actuator rods of adjacent similar mechanisms, means interconnecting said locating bolts and said actuator rod operative to project the bolts into engagement with the work fixture upon initial sliding movement of the actuator rod in one direction, and means coactive with said clamping device and said actuator rod operative to hold said clamping device released during said initial sliding movement and to engage said clamping mechanism with the fixture only after said initial sliding movement is completed.

3. Locating and clamping mechanism comprising a base adapted to support a separate movable work fixture, locating devices carried by said base and engageable with said fixture, separate clamping devices on said base positioned to clamp the fixture, an actuator in and mounted for longitudinal sliding movement relative to said base, means operatively connecting said locating devices to said actuator so that said devices are actuated to position the work fixture on the base by initial sliding movement of the actuator in one direction, yieldable means coacting with said clamping devices for holding the latter normally clampingly engaged with the fixture, and means on the actuator engaging the clamping devices during said initial sliding movement of the actuator to hold said clamping devices disengaged from said fixture against the action of said yieldable means and disengageable from said clamping devices when said initial movement is completed to permit said clamping devices to clampingly engage said fixture.

4. Locating and clamping mechanism comprising a base adapted to support a separate movable work fixture, locating bolts mounted for vertical sliding movement in the base and projectible thereabove, separate clamping devices mounted on said base to engage a fixture located by said bolts, yieldable means holding said clamping devices normally positioned to clamp the fixture, an actuator in and mounted for longitudinal sliding movement relative to said base, mechanism for transmitting sliding motion from said actuator to said locating bolts operative to project said bolts above the base by initial movement of the actuator in one direction, and means on said actuator engaging the clamping devices during said initial movement of the actuator to hold said clamping devices disengaged from the fixture against the action of said yieldable means and disengageable from the clamping devices when said initial movement is completed to permit said yieldable means to engage the clamping devices with the fixture.

5. Locating and clamping mechanism comprising a base adapted to support a separate movable work fixture, clamping devices on said base and engageable with the fixture, yieldable means coactive with said clamping devices to hold the latter normally in clamping engagement with the fixture, vertically slidable locating bolts carried by the base and projectible above the base to engage the fixture so as to locate the same on the base, an actuator rod mounted on the base for longitudinal sliding movement relative thereto, a shaft extending transversely between each locating pin and said actuator rod, rack and pinion means interconnecting each shaft and said actuator rod so that longitudinal sliding movement of the rod rotates said shaft, rack and pinion means interconnecting each shaft and its respective locating bolt so that rotation of the shafts slidably actuates said bolts, the arrangement being such that initial longitudinal movement of the actuator rod in one direction projects the locating bolts into engagement with the fixture to locate the same on the base, means on said actuator shaft engageable with the clamping devices during said initial sliding movement to hold said clamping devices disengaged from the fixture and disengageable from said clamping devices when said initial sliding movement is completed to permit said clamping devices to clampingly engage the fixture.

6. Locating and clamping mechanism comprising a base adapted to support a separate movable work fixture, vertically movable locating bolts carried by the base and projectible therefrom to engage and locate a fixture on the base, separate clamping devices on said base positioned to engage a fixture located by said bolts, an actuator rod mounted in and slidable longitudinally with respect to said base, said rod having terminal portions exposed at the ends of the base for abutting engagement with corresponding actuator rods of adjacent similar mechanisms, means interconnecting said locating bolts and said actuator rod operative to project the bolts into engagement with the work fixture upon initial sliding movement of the actuator rod in one direction, and means interconnecting said actuator rod and said clamping mechanism operative to hold said clamping mechanism released during said initial sliding movement and to engage said clamping mechanism with the fixture only after said initial sliding movement is completed.

7. Locating and clamping mechanism comprising a base adapted to support a separate movable work fixture, vertically movable locating bolts carried by the base and projectible therefrom to engage and locate a fixture on the base, at least one clamping device on the base positioned to engage a fixture located by said bolts and having a pivoted projecting element for operating said clamping device, an actuator rod mounted in and slidable longitudinally with respect to said base, means interconnecting said locating bolts and said actuator rod operative to project the bolts into engagement with the work fixture upon initial sliding movement of the actuator rod in one direction, yieldable means coactive with said clamping device and normally holding the same in clamping position, and abutments means on said actuator rod engageable with the operating element of said clamping device during said initial sliding movement to hold the same in unclamping position against the action of said resilient means, said abutment means being disengageable from the operating element of said clamping device when said initial sliding movement is completed to permit said yieldable means to move said clamping device into clamping position.

8. Locating and clamping mechanism comprising a base adapted to support a separate movable work fixture, vertically movable locating bolts carried by the base and projectible therefrom to engage and locate a fixture on the base, at least one clamping device on the base positioned to engage a fixture located by said bolts and having a pivoted projecting element for operating said clamping device, an actuator rod mounted in and slidable longitudinally with respect to said base, said rod having terminal portions exposed at the ends of the base for engagement with corresponding actuator rods of adjacent similar mechanisms, means interconnecting said locating bolts and said actuator rod operative to project the bolts into engagement with the work fixture upon initial sliding movement of the actuator rod in one direction, yieldable means coactive with said clamping device and normally holding the same in clamping position, and abutment means on said actuator rod engageable with the operating element of said clamping device during said initial sliding movement to hold the same in unclamping position against the action of said resilient means, said abutment means being disengageable from the operating element of said clamping device when said initial sliding movement is completed to permit said yieldable means to move said clamping device into clamping positon.

9. In a locating and clamping mechanism of the type having a base adapted to support a separate movable work fixture, vertically movable locating bolts carried by the base and projectible therefrom to engage and locate a fixture on the base, a pair of clamping devices at opposite sides of the base positioned to engage a fixture located by said bolts and each having pivoted projecting operating elements, resilient means coactive with said clamping devices to hold the same normally in clamping position, the improvement comprising an actuator rod mounted in and slidable longitudinally with respect to said base and between the operating elements of said clamping devices, means interconnecting said locating bolts and said actuator rod operative to project the bolts into engagement with the work fixture upon initial sliding movement of the actuator rod in one direction, and a cross pin carried by and movable with said actuator rod engageable with the projecting operating elements of said clamping devices during said initial sliding movement to hold said clamping devices in unclamped position against the action of said resilient means, said cross pin being disengageable from said operating elements after said initial sliding movement to permit said resilient means to move said clamping devices to clamping position.

10. Locating and clamping mechanism comprising a base adapted to support a separate movable work fixture, vertically movable locating bolts carried by the base and projectible therefrom to engage and locate a fixture on the base, a pair of clamping devices at opposite sides of the base positioned to engage a fixture located by said bolts and each having pivoted projecting operating elements, resilient means coactive with said clamping devices to hold the same normally in clamping position, an actuator rod mounted in and slidable longitudinally with respect to said base and between the operating elements of said clamping devices, said rod having terminal portions exposed at the ends of the base for engagement with corresponding actuator rods of adjacent similar mechanisms, means interconnecting said locating bolts and said actuator rod operative to project the bolts into engagement with the work fixture upon initial sliding movement of the actuator rod in one direction, and a cross pin carried by and movable with said actuator rod engageable with the projecting operating elements of said clamping devices during said initial sliding movement to hold said clamping devices in unclamped position against the action of said resilient means, said cross pin being disengageable from said operating elements after said initial sliding movement to permit said resilient means to move said clamping devices to clamping position.

11. Locating and clamping mechanism comprising a base adapted to support a separate movable work fixture, vertically movable locating bolts carried by the base and projectible therefrom to engage and locate a fixture on the base, a pair of clamping devices at opposite sides of the base positioned to engage a fixture located by said bolts and each having pivoted projecting operating elements, resilient means coactive with said clamping devices to hold the same normally in clamping position, an actuator rod mounted in and slidable longitudinally with respect to said base and between the operating elements of said clamping devices, a shaft extending transversely between each locating bolt and said actuator rod, rack and pinion means interconnecting each shaft and said actuator rod so that longitudinal sliding movement of the rod rotates such shaft, rack and pinion means interconnecting each shaft and its respective locating bolt so that rotation of the shafts slidably actuates said bolts, the arrangement being such that initial longitudinal sliding movement of the actuator rod in one direction projects the locating bolts into engagement with the fixture to locate the same on the base, and a cross pin carried by and movable with said actuator rod engageable with the projecting operating elements of said clamping devices during said initial sliding movement to hold said clamping devices in unclamped position against the action of said resilient means, said cross pin being disengageable from said operating elements after said initial sliding movement to permit said resilient means to move said clamping devices to clamping position.

RALPH E. CROSS.

References Cited in the file of this patent

UNITED STATES PATENTS

| Number | Name | Date |
|---|---|---|
| 1,737,002 | De Vlieg | Nov. 26, 1929 |
| 2,193,840 | Oberhoffken et al. | Mar. 19, 1940 |
| 2,302,878 | Muhl et al. | Nov. 24, 1942 |